(12) United States Patent
Tokutake

(10) Patent No.: US 9,377,943 B2
(45) Date of Patent: Jun. 28, 2016

(54) METHOD AND APPARATUS FOR OUTPUTTING DISPLAY DATA BASED ON A TOUCH OPERATION ON A TOUCH PANEL

(71) Applicant: Sony Corporation, Tokyo (JP)

(72) Inventor: Kenji Tokutake, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 451 days.

(21) Appl. No.: 13/905,671

(22) Filed: May 30, 2013

(65) Prior Publication Data

US 2014/0354583 A1 Dec. 4, 2014

(51) Int. Cl.
*G06F 3/044* (2006.01)
*G06F 3/0488* (2013.01)
*G06F 3/041* (2006.01)

(52) U.S. Cl.
CPC ............ *G06F 3/0488* (2013.01); *G06F 3/0416* (2013.01)

(58) Field of Classification Search
CPC ...... G06F 3/044; G06F 3/041; G06F 3/04883
See application file for complete search history.

(56) References Cited

U.S. PATENT DOCUMENTS

| | | | |
|---|---|---|---|
| 5,272,470 A * | 12/1993 | Zetts | G06F 3/04883 178/19.01 |
| 5,835,081 A | 11/1998 | Oka | |
| 6,788,297 B2 | 9/2004 | Itoh et al. | |
| 2002/0039092 A1* | 4/2002 | Shigetaka | G06F 3/044 345/156 |
| 2004/0028274 A1* | 2/2004 | Kawakami | G06K 9/222 382/187 |
| 2007/0205994 A1* | 9/2007 | van Ieperen | G06F 3/0488 345/173 |
| 2009/0315847 A1* | 12/2009 | Fujii | G06F 3/04883 345/173 |
| 2013/0212541 A1* | 8/2013 | Dolenc | G06F 3/017 715/863 |
| 2014/0184551 A1* | 7/2014 | Igarashi | G06F 3/041 345/173 |

* cited by examiner

*Primary Examiner* — Kathy Wang-Hurst
*Assistant Examiner* — Peijie Shen
(74) *Attorney, Agent, or Firm* — Oblon, McClelland, Maier & Neustadt, L.L.P.

(57) ABSTRACT

An apparatus includes a touch panel display including one or more sensors for detecting an input operation by an instruction object. The apparatus includes circuitry that acquires one or more coordinates corresponding to one or more positions of the instruction object on the touch panel display, and determines whether a current condition of the instruction object during the input operation is an up condition or a down condition. The circuitry determines, when the current condition is the down condition, based on one or more previous conditions of the instruction object stored in a memory, whether the previous condition immediately preceding the current condition is the up condition and if so, converts the immediately preceding previous condition to the up condition. The circuitry controls the touch panel display to output a continuous line corresponding to the acquired one or more coordinates at which the instruction object is in the down condition.

20 Claims, 15 Drawing Sheets

METHOD AND APPARATUS FOR OUTPUTTING DISPLAY DATA BASED ON A TOUCH OPERATION ON A TOUCH PANEL

BACKGROUND

1. Technical Field

The present disclosure relates to a method and apparatus for displaying data. In particular, the present disclosure relates to a method and apparatus for displaying data based on aspects of a touch operation performed on a touch panel.

2. Description of Related Art

Recent mobile devices utilize touch panel displays for allowing a user to perform input operations using an instruction object, such as a finger or a stylus. In some devices, a user may draw, for example, a character on the touch panel display using the finger and/or stylus. The touch panel may detect changes in position of the instruction object in contact with an operation surface of the touch panel display, for example, by a change in sensor output values such as electrostatic capacitance. In contrast with touch operations allowing users to perform individual "tap" operations for selecting icons, characters on a virtual keyboard, etc., these touch screen displays allow users to input handwritten characters, numbers, etc. by moving the instruction object on the operation surface of the touch panel display in a corresponding shape of the desired character, number, etc. When an instruction object such as a stylus is moved to form handwritten characters, the contact state of the instruction object such as a stylus on the operation surface of the touch panel display may become unstable, which may result in interruptions of the displayed characters. While these handwritten character interruptions on touch panel displays may occur when using a finger as an instruction object, such instability becomes especially prevalent when relatively thinner instruction objects such as a stylus are used when performing such input operations.

SUMMARY

In one aspect of the present disclosure, an apparatus includes a touch panel display having one or more sensors for detecting an input operation by an instruction object on an operation surface of the touch panel display. The apparatus may include circuitry configured to acquire, from the one or more sensors, one or more coordinates corresponding to one or more positions of the instruction object on the operation surface of the touch panel display during the input operation. The circuitry may determine, as a first determination based on an output from the one or more sensors in response to detecting the input operation, a current condition of the instruction object during the input operation, the current condition being an up condition or a down condition. The circuitry may determine, as a second determination when the current condition of the instruction object is the down condition, based on one or more previous conditions of the instruction object stored in a memory, whether the previous condition immediately preceding the current condition is the up condition. The circuitry may convert, when the previous condition immediately preceding the current condition is the up condition, the immediately preceding previous condition to the down condition and update the one or more previous conditions stored in the memory based on the conversion result. The circuitry may control, based on the one or more acquired coordinates and the one or more previous conditions stored in the memory, the touch panel display to output a continuous line in the interface corresponding to the acquired one or more coordinates at which the instruction object is determined to be in the down condition. The down condition may correspond to a state in which the instruction object is within a predetermined range from the operation surface of the touch panel display, and the up condition may correspond to a state in which the instruction object is outside the predetermined range from the operation surface of the touch panel display. A shape of the continuous line may correspond to a movement of the instruction object on the operation surface of the touch panel display during the input operation.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
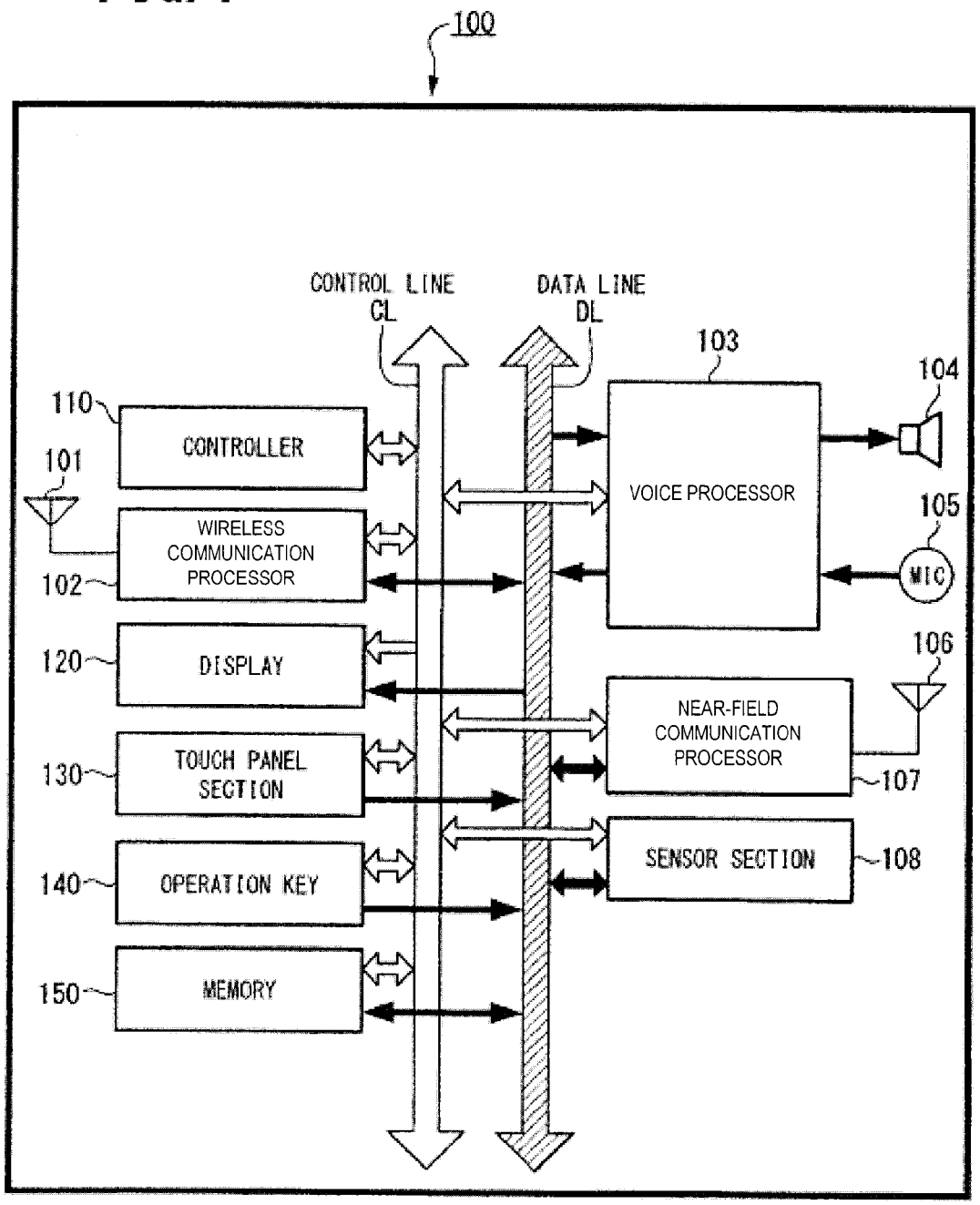
FIG. 1 illustrates an exemplary block diagram for a mobile device according to one aspect of the present disclosure.

Referring now to the drawings, wherein like reference numerals designate identical or corresponding parts throughout the several views.

FIG. 1 illustrates a block diagram for an exemplary mobile device 100.

The exemplary mobile device 100 of FIG. 1 includes a controller 110, a wireless communication processor 102 connected to an antenna 101, a speaker 104, a microphone 105, and a voice processor 103.

The controller 110 may include one or more Central Processing Units (CPUs), and may control each element in the mobile device 100 to perform features related to communication control, audio signal processing, control for the audio signal processing, image processing and control, and other kinds signal processing. The controller 110 may perform these features by executing instructions stored in a memory 150 or a non-transitory computer readable medium having instructions stored therein.

The antenna 101 transmits/receives electromagnetic wave signals between base stations for performing radio-based communication, such as the various forms of cellular telephone communication.

The wireless communication processor 102 controls the communication performed between the mobile device 100 and other external devices. For example, the wireless communication processor 102 may control communication between base stations for cellular phone communication.

The speaker 104 emits an audio signal corresponding to audio data supplied from the voice processor 103.

The microphone 105 detects surrounding audio, and converts the detected audio into an audio signal. The audio signal may then be output to the voice processor 103 for further processing.

The voice processor 103 demodulates and/or decodes the audio data read from the memory 105, or audio data received by the wireless communication processor 102 and/or a near-field wireless communication processor 107. Additionally, the voice processor 103 may decode audio signals obtained by the microphone 105.

The exemplary mobile device 100 may also include a display 120, a touch panel section 130, an operation key 140, the memory 150, and the near-field communication processor 107 connected to an antenna 106.

The display 120 may be a Liquid Crystal Display (LCD), an organic electroluminescence display panel, or another known display screen technology. In addition to displaying an output corresponding to a movement of an instruction object during a touch operation, the display 120 may display operational inputs, such as numbers or icons, which may be used for control of the mobile device 100. The display 120 may additionally display a graphical user interface with which a user may control aspects of the mobile device 100. Further, the display 120 may display characters and images received by the mobile device 100 and/or stored in the memory 150. For example, the mobile device 100 may access a network such as the Internet, and display text and/or images transmitted from a Web server.

The touch panel section 130 may include a physical touch panel display screen and a touch panel driver. The touch panel section 130 may include one or more touch sensors for detecting an input operation on an operation surface of touch panel display screen. Used herein, the phrasing "touch operation" refers to an input operation performed by touching an operation surface of the touch panel display with an instruction object, such as a finger or stylus-type instrument. In the case where a stylus, or the like, is used in a touch operation, the stylus may include a conductive material at least at the tip of the stylus such that the sensors included in the touch panel section 130 may detect when the stylus approaches/contacts the operation surface of the touch panel display (similar to the case in which a finger is used for the touch operation).

In certain aspects of the present disclosure, the touch panel display screen may be disposed adjacent to the display 120 (e.g., laminated), or may be formed integrally with the display 120. The touch panel section 130 and the display 120 may be surrounded by a protective casing, which may also enclose the other elements included in the mobile device 100.

For simplicity, examples discussed in the present disclosure often assume the touch panel section 130 is a capacitance-type touch panel technology; however, it should be appreciated that aspects of the present disclosure may easily be applied to other touch panel types (e.g., resistance type touch panels) with alternate structures. In certain aspects of the present disclosure, the touch panel 130 may include transparent electrode touch sensors arranged in the X-Y direction on the surface of transparent sensor glass.

The touch panel driver may be included in the touch panel section 130 for control processing related to the touch panel section 130, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger, is within a predetermined distance from an operation surface of the touch panel display screen. That is, the instruction object does not necessarily need to directly contact the operation surface of the touch panel display screen for touch sensors to detect the instruction object and perform processing described herein. Signals may be transmitted by the touch panel driver, e.g., in response to a detection of a touch operation, in response to a query from another element, based on timed data exchange, etc.

The operation key 140 may include one or more buttons or similar external control elements, which may generate an operation signal based on a detected input by the user. In addition to outputs from the touch panel section 130, these operation signals may be supplied to the controller 110 for performing related processing and control. In certain aspects of the present disclosure, the processing and/or functions associated with external buttons and the like may be performed by the controller 110 in response to an input operation on the touch panel section display screen rather than the external button, key, etc. In this way, external buttons on the mobile device 100 may be eliminated in lieu of performing inputs via touch operations, thereby improving water tightness.

The memory 150 may include, e.g., Read Only Memory (ROM), Random Access Memory (RAM), or a memory array comprised of a combination of volatile and non-volatile memory units. The memory 150 may be utilized as working memory by the controller 110 while executing the processing and algorithms of the present disclosure. Additionally, the memory 150 may be used for long-term storage, e.g., of images and information related thereto.

The antenna 106 may transmit/receive electromagnetic wave signals to/from other external apparatuses, and the near-field communication processor 107 may control the wireless communication performed between the other external apparatuses. Bluetooth, Wi-Fi, and near-field communication (NFC) are non-limiting examples of wireless communication protocols that may be used for inter-device communication.

The mobile device 100 is equipped with a control line CL and data line DL as internal communication bus lines. Control data to/from the controller 110 may be transmitted through the control line CL. The data line DL may be used for transmission of voice data, display data, etc.

Figure 2A:
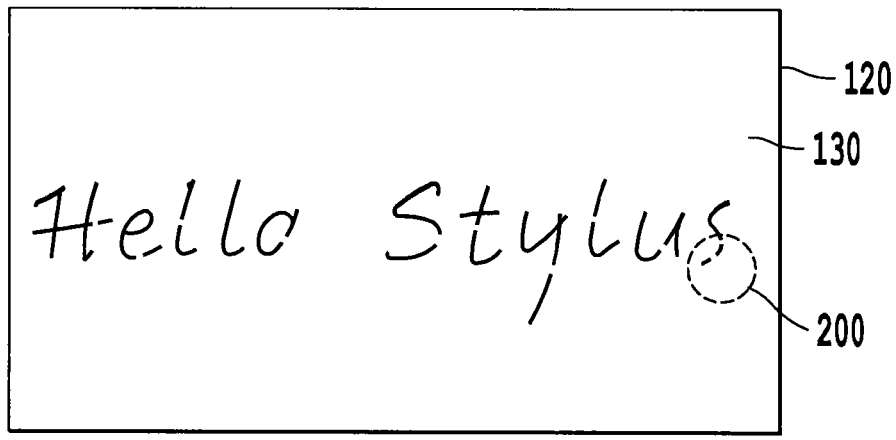
FIG. 2A illustrates an exemplary display showing interruptions of lines output in response to an input operation.
Figure 2B:
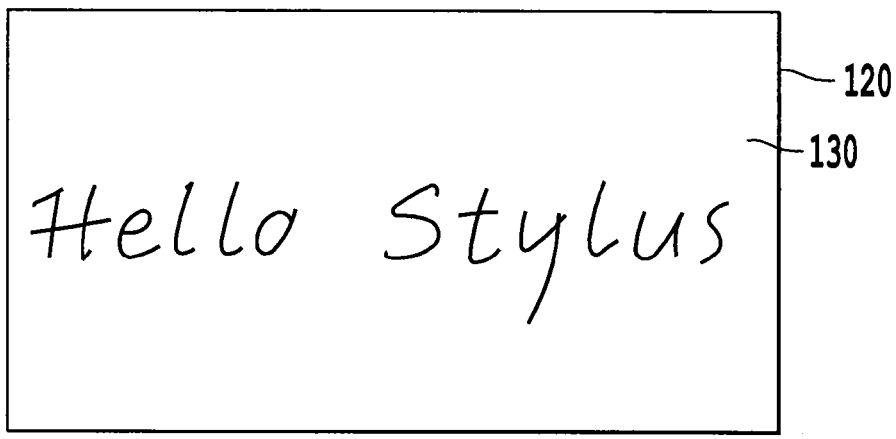
FIG. 2B illustrates an improved display output corresponding to the displayed output of FIG. 2A.

Next, FIGS. 2A and 2B illustrate non-limiting examples of handwritten character strings displayed on a touch panel device in response to a corresponding motion of an instruction object in the shape of the character strings on an operation surface of a touch panel display. For the sake of simplicity, external elements that may typically be included in the mobile device 100 such as protective casing have been omitted from the examples of FIGS. 2A and 2B.

Referring first to FIG. 2A, FIG. 2A illustrates a handwritten text string "Hello Stylus" displayed on the display 120. As shown in the figure, numerous breaks/disconnects can be seen in the lines forming the displayed character string. The breaks/disconnects in the displayed lines may occur, e.g., when the instruction object used in the input operation momentarily breaks contact from the operation surface of the touch panel 130. Area 200 in FIG. 2A highlights portions of the character "s" of "Stylus" that are disconnected due to unstable/intermittent contact by the instruction object with the operation surface of the touch panel 130. Disconnected lines displayed on the display 120 make the character strings more difficult to read and unrepresentative of actual handwritten text, thereby decreasing user friendliness of such a device.

In contrast with the example of FIG. 2A, FIG. 2B illustrates a corresponding handwritten character string to the string shown in FIG. 2A; however, the disconnects in the lines forming the displayed character string, such as those breaks shown in the area 200 in FIG. 2A, are not present in the example of FIG. 2B. The improvement in the displayed character string shown in FIG. 2B may, for example, result from the instruction object (e.g., a finger or stylus) used during the input operation maintaining constant contact with the operation surface of the touch panel 130 during the touch operation. However, maintaining constant contact with an instruction object on the operation surface of the touch panel may prove difficult, especially for handheld mobile devices, in which case aspects of the present disclosure may be applied such that display performance is increased by controlling the touch panel display such that the characters are respectively output as a continuous line. That is, aspects of the present disclosure may prevent unintentional breaks in a continuous line forming, e.g., a handwritten character.

Figure 3A:
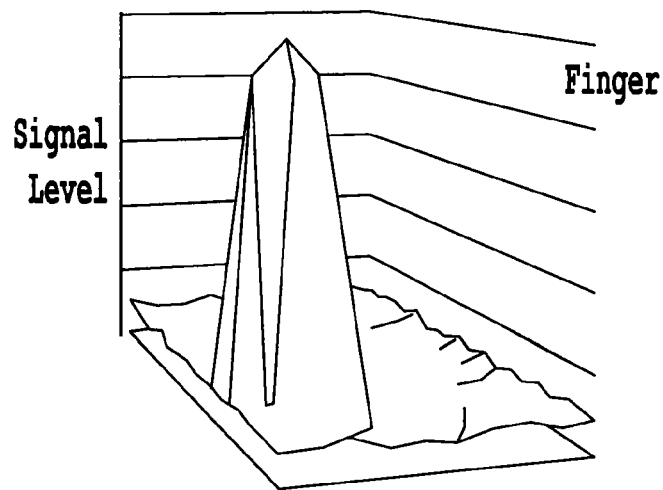
FIG. 3A illustrates an exemplary graph corresponding to a sensor output resultant from a touch operation performed with a finger.
Figure 3B:
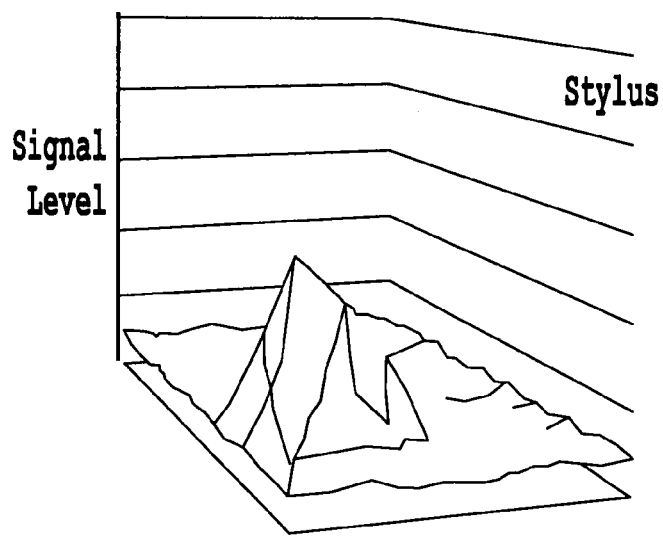
FIG. 3B illustrates an exemplary graph corresponding to a sensor output resultant from a touch operation performed with a stylus.

Next, FIGS. 3A and 3B illustrate touch panel sensor outputs resultant from contacting the operation surface of a touch panel display with a user's finger and a stylus, respectively. As a non-limiting example, the sensor outputs corresponding to FIGS. 3A and 3B may be electrostatic capacitance values output by sensors included in an electrostatic capacitance type touch panel. The sensor outputs illustrated in FIGS. 3A and 3B are shown in three dimensions such that both the sensor coordinate and corresponding signal level magnitude of an input operation with each respective instruction object may be viewed. Locations in the graphs shown in FIGS. 3A and 3B at which the sensor output values are highest correspond to the locations on the operation surface of the touch panel device that the instruction object (i.e., the user's finger and stylus, respectively) is contacting the operation surface of the touch panel. Other locations of the three-dimensionally displayed graph at which sensor output values are not peaking may correspond to low level noise outputs detected by surrounding sensors. For the purposes of this example, FIGS. 3A and 3B assume all conditions are the same with the exception of the type of instruction object used during the touch operation.

By comparing the sensor output graphs shown in FIGS. 3A and 3B, it can be shown that in the case in which a stylus is used to perform an input operation, the sensor output magnitude peak is low compared to the case in which a finger is used to perform the input operation. Moreover, in the case in which a finger is used to perform the input operation, the size/area of the location where the sensor output value becomes high is relatively large compared to the case in which a stylus is used for performing the input operation. In contrast, the size of the location where the sensor output value becomes high is comparatively narrow in the case in which a stylus is used when performing the input operation. In certain aspects of the present disclosure, the controller 110 may distinguish between touch operations performed with a finger or a stylus based on the peak value of the sensor output resulting from the touch operation, and/or based on the size/area of the location where the sensor output values become high. In certain aspects of the present disclosure, the controller 110 may change a detection state and/or interruption condition for touch operations based on a distinction between whether a finger and a stylus is used for a touch operation. It should be noted, however, that the distinction between a finger and another instruction object such as a stylus is not necessary for the purposes of the present disclosure.

Figure 4:
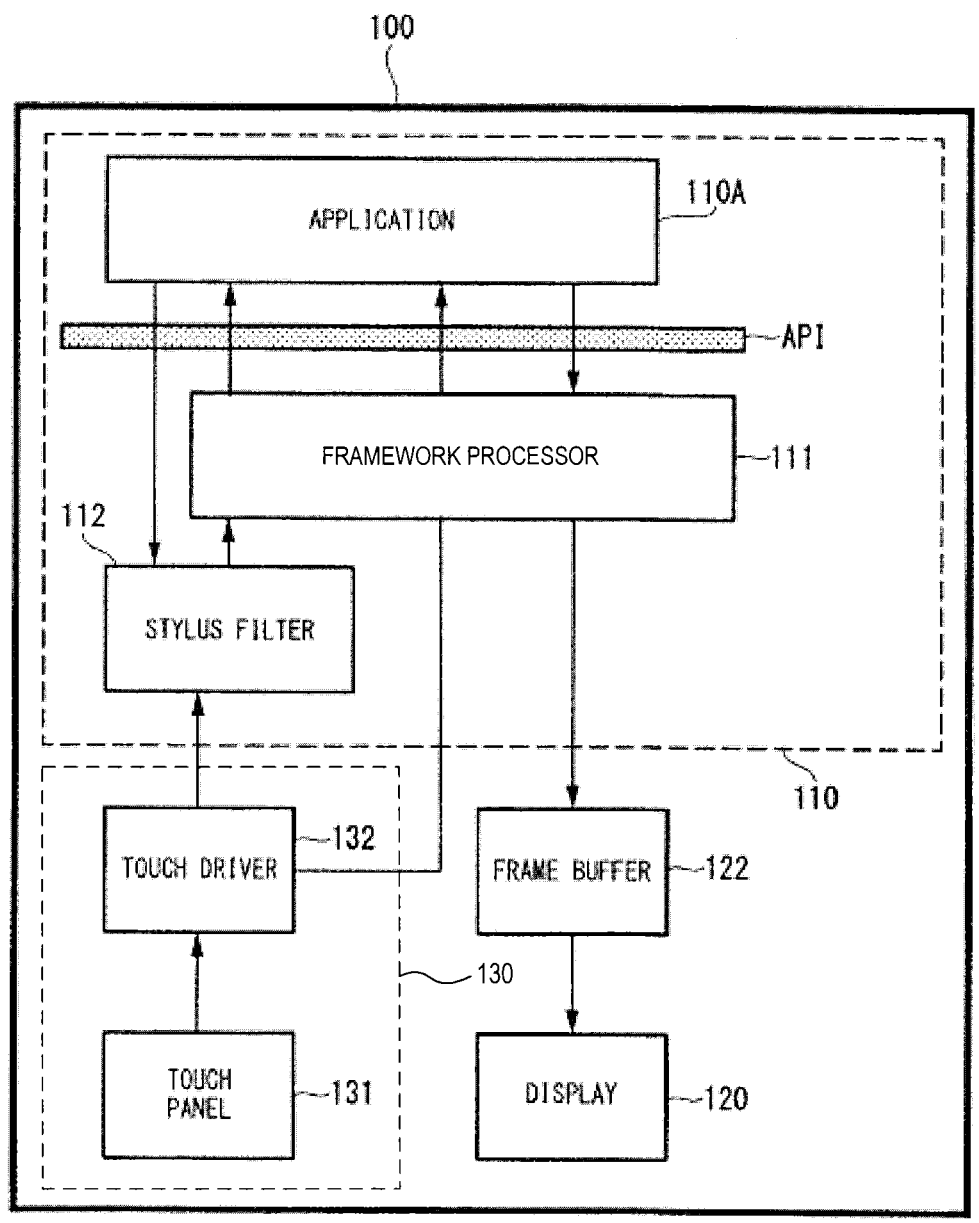
FIG. 4 illustrates an exemplary block diagram for a controller according to one aspect of the present disclosure.

Next, FIG. 4 illustrates a non-limiting example of a block diagram showing an exemplary structure of the controller 110. The exemplary structure illustrated in FIG. 4 shows a case in which the controller 110 changes the display output of the display 120 based on detected features of a touch operation. FIG. 4 illustrates the touch panel section 130 as including the touch panel 131 and the touch driver 132. The touch driver 132 may drive the touch panel 131 for detecting a position/coordinate of a touch operation performed on the operation surface of the touch panel 131. Data corresponding to the touch position/coordinate detected by the touch driver 132 during the touch operation may be supplied to the controller 110 for further processing.

FIG. 4 illustrates the controller 110 as including a framework processor 111 and a stylus filter 112. In certain aspects of the present disclosure, the framework processor 111 may execute an application 110A, which may be stored in the memory 150. The application 110A is illustrated as being within the controller 110 in the figure for illustration purposes. For the purposes of this example, the application 110A may be assumed to be stored in a dedicated memory that transmits signals to and from other elements of the controller 110 and the mobile device 100. A determination as to whether the stylus filter 112 should be applied during processing of the controller 110 may, in certain aspects of the present disclosure, be determined by the instructions executed with respect to the application 110A. For example, the application 110A may apply the stylus filter 112 when the controller 110 detects a stylus performing a touch operation. Conversely, the application 110A may determine that the stylus filter 112 should not be applied when the controller 110 determines that a touch operation is being performed with a finger. The stylus filter 112 may, in certain aspects of the present disclosure, be equipped with a trace tearing filter and a smoothing filter, which will be described in further detail in later paragraphs.

The framework processor 111 may acquire data corresponding to a determination as to the presence or absence of a touch operation based on an input from the touch driver 132. The framework processor 111 may also acquire data corresponding to a coordinate position of the touch panel 131 that is touched during the touch operation. Coordinate positions may be represented as a time series including corresponding sensor magnitudes, which provides for temporal analysis of sensor outputs. Data representing the presence or absence of a touch may be classified as "down" data in the case in which the touch panel 131 is in a touched state, and "up" data when the touch panel 131 is in a state in which it is not being touched by an instruction object.

The framework processor 111 may read the application 110A through an application programming interface (API) when executing the application 110A. Image data acquired/generated when the framework processor 111 executes the application 110A may be supplied to a frame buffer 122. The image data may correspond to free-form data entry, such as the character string entered in the example of FIGS. 2A and 2B. The display 120 may perform a display process of outputting the image data that accumulates in the frame buffer 122.

Figure 5:
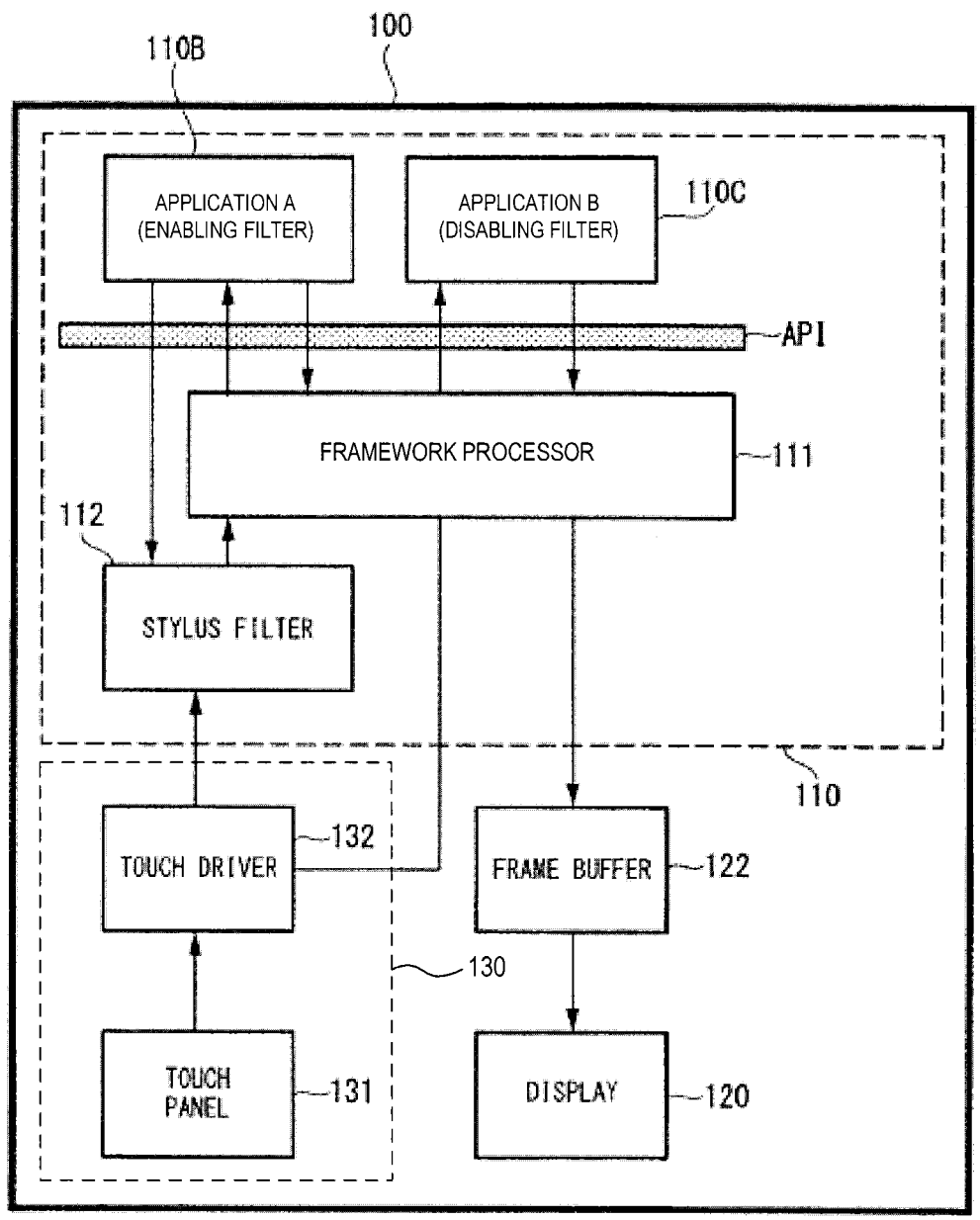
FIG. 5 illustrates an exemplary block diagram for a controller according to another aspect of the present disclosure.

Next, FIG. 5 illustrates another non-limiting example of a block diagram of a structure for the controller 110. FIG. 5 illustrates an exemplary case in which multiple applications may be executed in response to a determination as to whether filters should be applied when outputting image data corresponding to a touch operation. In the exemplary case of FIG. 5, the controller 110 may execute a first application 110B when a determination is made that an input operation is being performed with a stylus (or a similar type instruction object), and subsequently update the display 120 based on the touch operation using the stylus. In this case, the application 110B may enable the stylus filter 112 during its processing. A second application 110C may be executed by the controller 110 when a determination is made that a touch operation is being performed using a stylus; however, the second application 110C may perform its processing while disabling the use of the stylus filter 112. As non-limiting examples of applications for using the first application 110B and the second application 110C, the first application 110B may be executed when outputting a hand-drawn character, number, figure, etc. based on a change of touch position determined by the controller 110, and the second application 110C may be executed when the instruction object is used during "tap" operations to select icons or the like displayed on the display 120.

Figure 6:
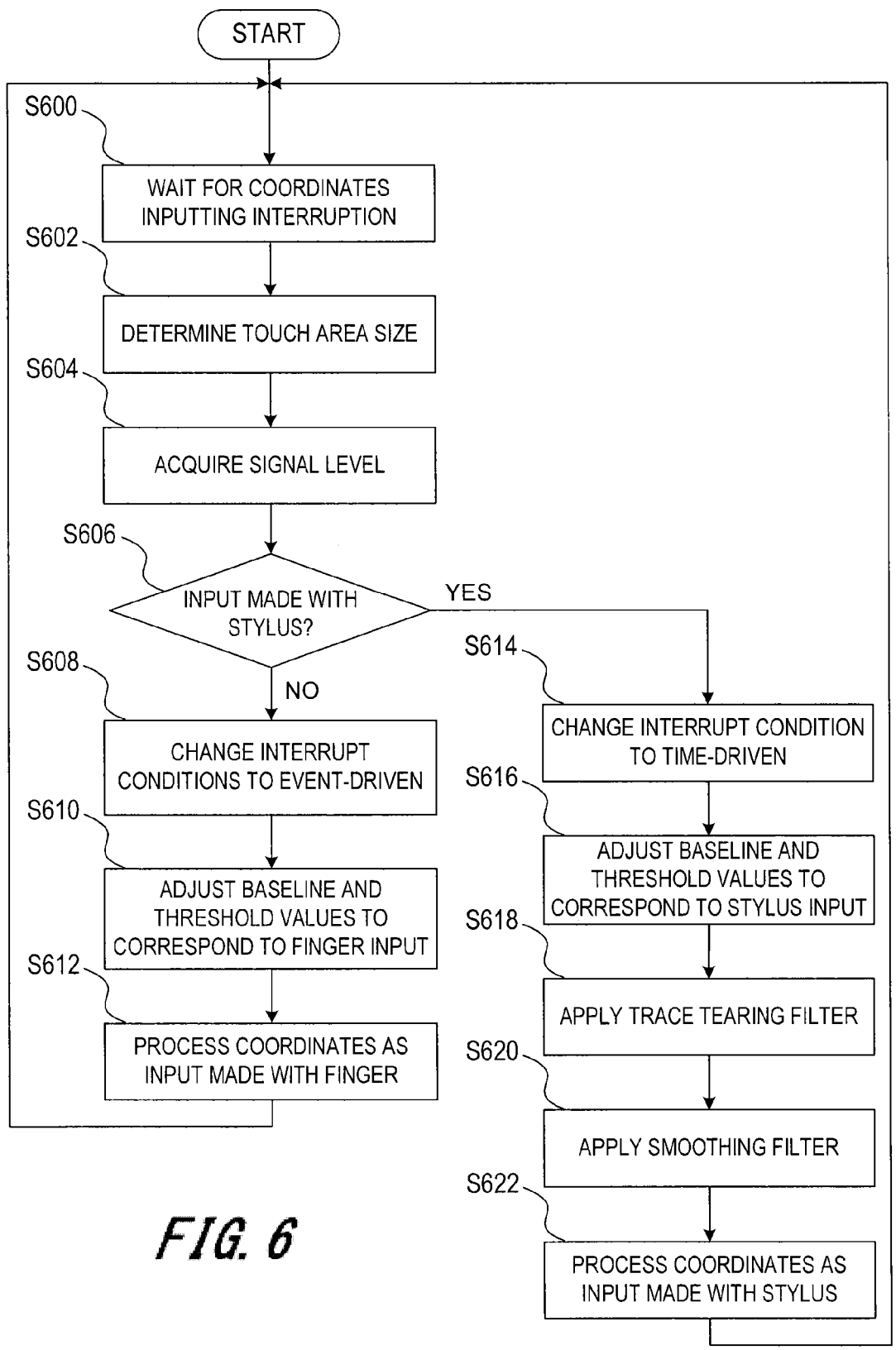
FIG. 6 illustrates an exemplary algorithmic flowchart for processing a touch operation according to one aspect of the present disclosure.

Next, FIG. 6 illustrates a non-limiting example of an algorithmic flowchart for executing an application based on a detection of a touch operation on a touch panel display. For example, FIG. 6 may illustrate a case in which the controller 110 executes the application 110A or the application 110B discussed above with respect to FIGS. 4 and 5, respectively.

At step S600, the controller 110 waits until an interruption signal is received from the touch panel section 130. The interruption signal may include or correspond to a coordinate position corresponding to a position of the operation surface of the touch panel 131 at which a touch was detected. In certain aspects of the present disclosure, the interruption signal may include the detected sensor value magnitude and corresponding coordinate position for each sensor (or a subset thereof) included in the touch panel 130. For example, sensor value magnitudes and corresponding coordinates such as those illustrated in the exemplary graphs of FIGS. 3A and 3B may be included in the interruption signal.

At step S602, the controller 110 determines a touch area size based on the sensor value output magnitude and/or coordinates received in the interruption signal at step S600. The touch area size may correspond to an aggregated area of touch coordinates having sensor output magnitudes above a predetermined threshold value (e.g., a predetermined range corresponding to detected background noise).

At step S604, the controller 110 acquires the sensor output signal level detected by the touch panel section 130, and determines the change of the sensor level values. As a non-limiting example, in the case in which an electrostatic capacitance-type device is used in the touch panel section 130, the controller 110 may acquire the electrostatic capacitance values detected by the touch panel section 130 and determine an electrostatic capacitance potential change at step S604.

At step S606, the controller 110 determines, based on the received sensor value magnitudes and coordinate positions, whether the input operation was performed with a finger or a relatively smaller instruction object such as a stylus-type instruction object. If the controller 110 determines that a stylus has performed the input operation, the controller 110 at step S608 changes the conditions for performing an interruption process to an "event-driven" condition. Exemplary conditions for performing an interruption process that may be changed in step S608 may include a condition in which the coordinate position where a touch operation is detected has been changed, or a condition in which a sensor output magnitude value is changed by at least a predetermined value.

At step S610, the controller 110 sets a threshold value for detecting a touch operation as a threshold value corresponding to performing a touch operation with a finger. The threshold value of step S610 may correspond to a typical sensor output magnitude detected for touch operations performed with a finger on a given sensor type. In addition to the threshold value, the controller 110 at step S610 may also adjust a baseline value for detection to correspond with a finger-based input. The baseline value may correspond to a sensitivity setting. For example, if the baseline value is increased, the controller 110 may be more sensitive to input detection. Conversely, if the baseline value is decreased, the controller 110 may be less responsive to input detection.

When sensor output values are higher than the threshold values set at step S610, the controller 110 at step S612 performs a predetermined function corresponding to the coordinate position at which a touch operation is detected. For example, the controller 110 may execute a predetermined function corresponding to displaying lines on the display 120 in response to corresponding movements of the finger on the operation surface of the touch panel 131 (e.g., the display output in FIG. 2B).

If the controller 110 determines at step S606 that the touch operation was performed with a stylus-type instruction object, the controller 110 at step S614 changes the condition at which an interruption process is performed to a "time-driven" condition. As a non-limiting example, the time-driven condition set at step S614 may correspond to a periodic sampling frequency (e.g., a 60 Hz cycle). That is, in certain aspects of the present disclosure, the condition at which the interruption processing is performed may correspond to detecting a touch position based on the sampling frequency set at step S614.

At step S616, the controller 110 sets the threshold value for detecting a touch operation as a threshold value corresponding to performing a touch operation using a stylus, or the like. The threshold value of step S616 may correspond to a typical sensor output magnitude detected for touch operations performed with a stylus-type instruction object on a given sensor type. In addition to the threshold value, the controller 110 at step S616 may also adjust a baseline value for detection to correspond with a stylus-based input. The baseline value set at step S616 may be similar to the baseline value previously discussed with regard to step S610.

At step S618, the controller 110 applies the trace tearing filter, which prevents an interruption of a line drawn in response to a change in a touch position of the instruction object during the touch operation. Aspects of applying the trace tearing filter are discussed later with respect to FIGS. 9 and 10.

At step S620, the controller 110 applies a smoothing filter that is included in the stylus filter 112. The smoothing filter is a filter that smooths the line drawn in response to a change in the touch position of the instruction object during the touch operation. Aspects of applying the smoothing filter are discussed later with respect to FIGS. 13 through 16.

At step S622, the controller 110 performs processing based on the coordinate position at which a touch operation is detected when the sensor output value magnitudes are higher than the threshold value for a stylus set at step S616. For example, the controller 110 may execute a process for displaying a line on the display 120 starting at the initial touch position and ending at a final touch position after moving the instruction object on the operation surface of the touch panel 131.

Figure 7:
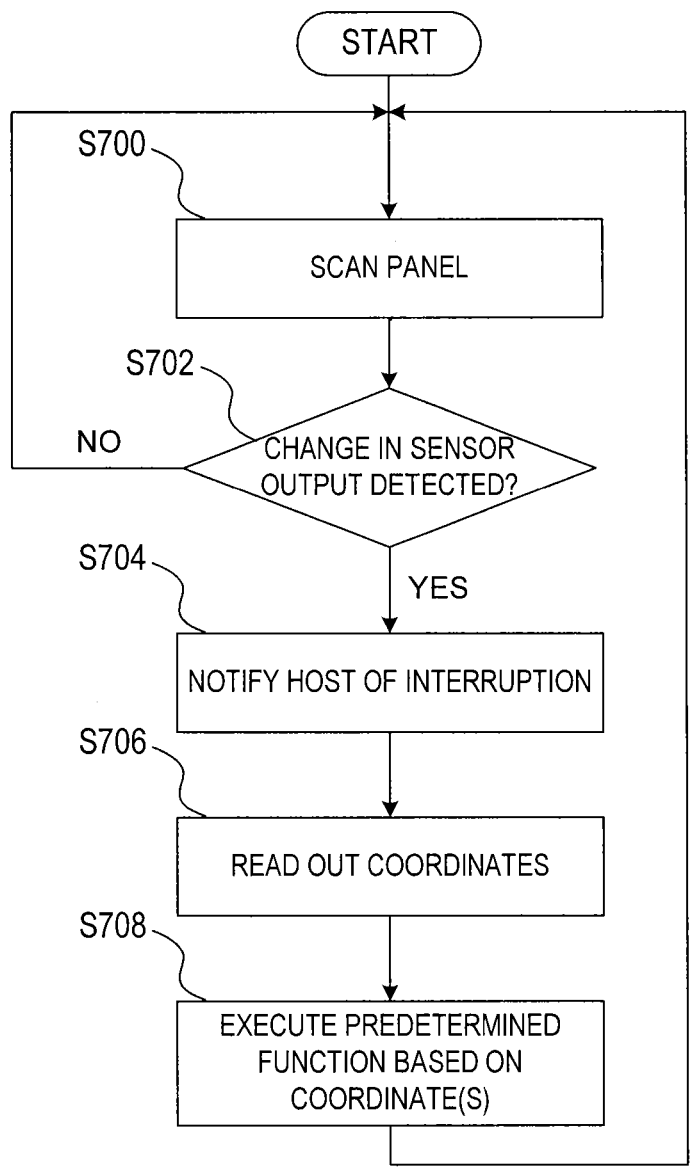
FIG. 7 illustrates an exemplary algorithmic flowchart for performing processing in an interrupt mode according to one aspect of the present disclosure.

Next, FIG. 7 illustrates an exemplary algorithmic flowchart for performing processing in response to a touch operation performed in an interrupt mode. In certain aspects of the present disclosure, the interrupt mode may correspond to a case where a touch/input event is reported only when an object detection status has changed.

Referring to the figure, the touch panel driver 132 scans the touch panel 131 at step S700 and the controller 110 determines, based on the scanning result of step S700, whether a change in sensor output is detected in response to a touch operation. If a change in sensor output is detected at step S702, the controller 110 generates an interruption signal for performing interruption processing and notifies a host device of the generation of the interruption signal. The host device, in response to receiving an interruption signal and/or the notification that the interruption signal was generated, may then execute an application program. At step S706, the controller 110 reads out coordinate positions corresponding to the touch operation performed on the operation surface of the touch panel 131. At step S708, the controller 110 executes processing based on the determined coordinate positions from step S706. The processing corresponding to the coordinates determined at step S706 may, in certain aspects of the present disclosure, corresponding to displaying a line, characters, numbers, etc. in response to the user moving his or her finger about the operation surface of the touch panel 131.

Figure 8:
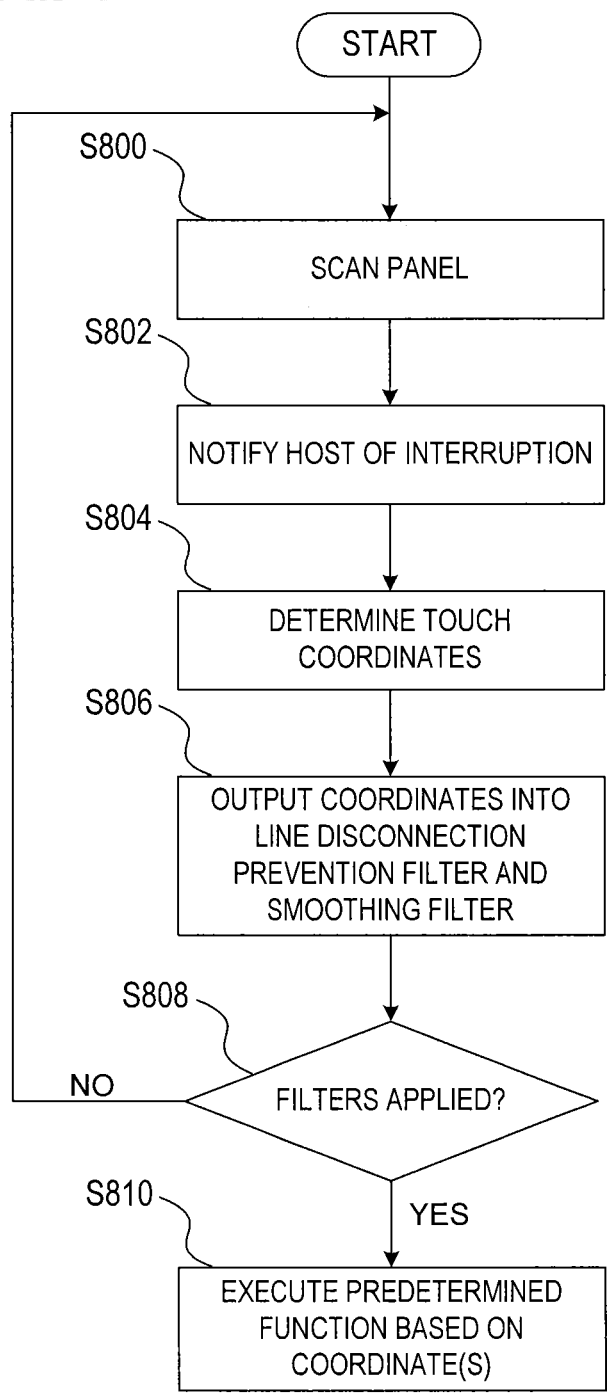
FIG. 8 illustrates an exemplary algorithmic flowchart for processing a touch operation in a continuous report mode according to one aspect of the present disclosure.

Next, FIG. 8 illustrates an exemplary algorithmic flowchart for processing a touch operation in a continuous report mode. In certain aspects of the present disclosure, the controller 110 may continuously read the touch panel cyclically, e.g., to determine whether an up event has occurred.

Referring now to FIG. 8, the touch panel driver 132 scans the touch panel 131 at step S800. At step S802, the controller 110 notifies a host device of the generation of an interruption signal. In response to the generation of the interruption signal and/or based on the data included in the interruption signal, the host device may execute an application program. At step S804, the controller 110 determines touch coordinates corresponding to the detected touch operation. The touch coordinates may be determined based on the result of the scanning operation performed at step S800. The controller 110 at step S806 outputs the determined coordinates to the trace tearing filter and the smoothing filter. In addition to the touch coordinates, the controller 110 may output corresponding sensor output magnitudes (e.g., electrostatic capacitance magnitude values) for use by the trace tearing filter and/or the smoothing filter. The controller 110 determines at step S808 whether the trace tearing filter and/or the smoothing filter are applied, or whether insufficient sampling of touch operation data prevents processing related to the trace tearing filter and/or the smoothing filter from being performed. If the controller 110 determines at step S808 that the filters are to be applied, the controller 110 at step S810 executes a predetermined function based on the touch coordinates. For example, the controller 110 may execute processing related to displaying a line corresponding to a movement of the stylus on the operation surface of the touch panel 131.

Figure 9:
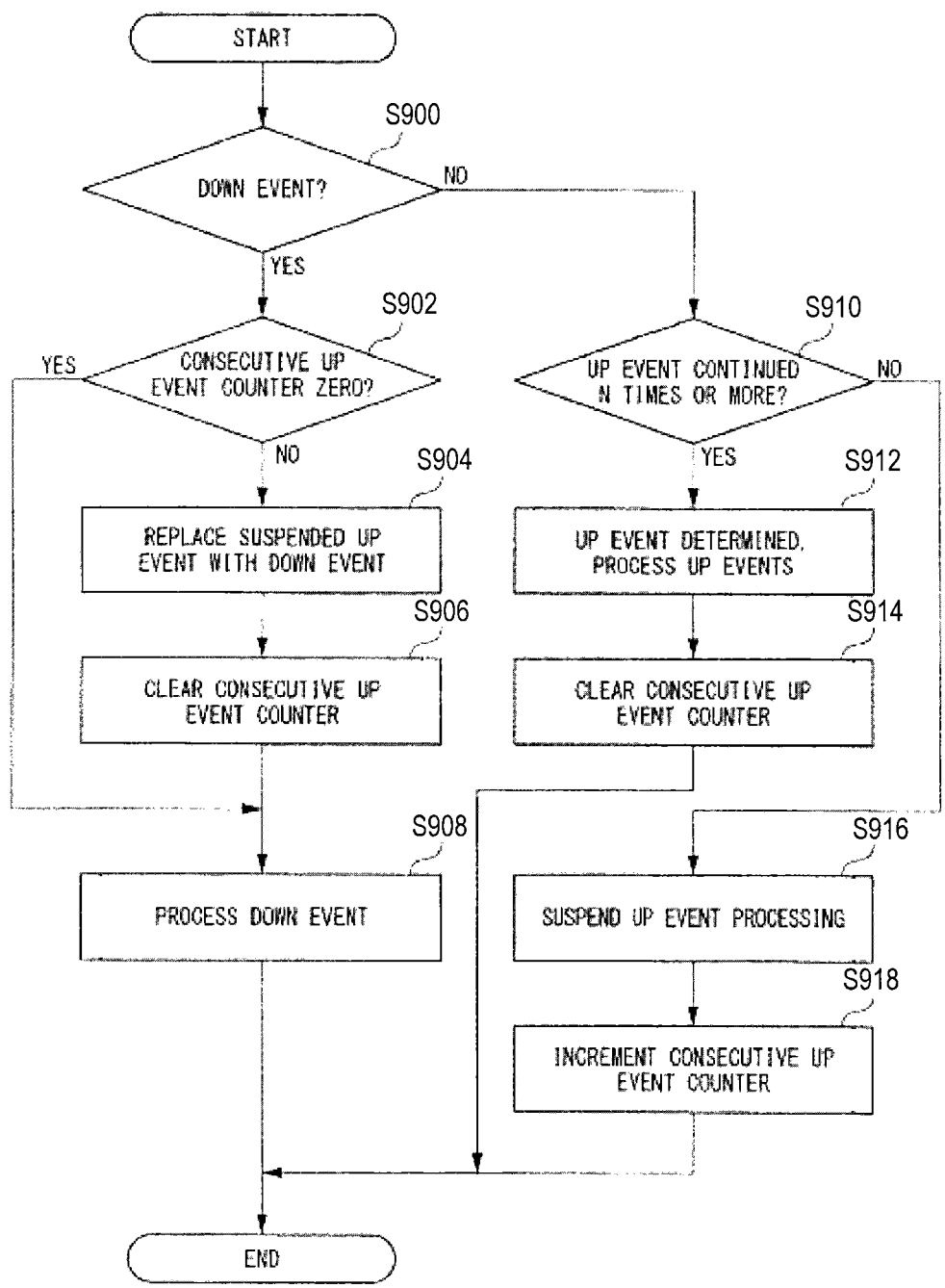
FIG. 9 illustrates an exemplary algorithmic flowchart for processing performed by a trace tearing filter according to one aspect of the present disclosure.

Next, FIG. 9 illustrates an exemplary algorithmic flowchart showing an example of processing performed by the trace tearing filter according to one aspect of the present disclosure.

At step S900, the trace tearing filter determines whether a "down" event has been generated as a result of a stylus contacting the operation surface of the touch panel 131. In one aspect of the present disclosure, a "down" or "up" event may be generated for every fixed sampling period, e.g., according to the interruption conditions set by step S614 of the flowchart illustrated in FIG. 6.

If the trace tearing filter determines at step S900 that a down event has been generated, the trace tearing filter determines at step S902 whether a current value of a consecutive up event counter is equal to zero. The current value of the consecutive up event counter may correspond to the number of consecutive up events occurring subsequent to the currently analyzed down event. For example, if the current value of the consecutive up event counter equals one, the current value may indicate that the immediately preceding condition of the touch panel display was an up condition. In certain aspects of the present disclosure, the controller 110 may, in response to determining a current condition of the touch panel display is a down condition/event, convert one or more previously detected up conditions/events detected prior to (e.g., immediately preceding) the current down condition/event to the down condition. In other aspects of the present disclosure, the conversion of previously detected up events/conditions to the down condition may be based on a determination as to whether the current event is detected within a predetermined time period relative to a previously detected event/condition.

If the trace tearing filter determines at step S902 that the consecutive up event counter is equal to zero, the trace tearing filter at step S908 outputs the down event indicating that the stylus is contacting the operation surface of the touch panel 131.

Otherwise, if the consecutive up event counter is determined to be a value other than zero at step S902, the trace tearing filter replaces the suspended up event with a down event. It is noted that an up event may be previously suspended, for example, at processing described later for step S916. At step S906, the trace tearing filter clears the current value of the up event counter such that the current value is equal to zero, and the down event is processed at step S908.

If the trace tearing filter determines at step S900 that an up event has been generated, the trace tearing filter at step S910 determines whether the up event has been continuously generated greater than or equal to N times. The value of N is typically a relatively small value, such as 5 to 7 times. However, it is noted that the value of N may be changed as appropriate based on changes to the periodic sampling frequency, such as the sampling frequency set at step S614 of FIG. 6.

If the trace tearing filter determines at step S910 that the up event has continuously occurred greater than or equal to N times, the presently analyzed event is determined as an up event, and additionally the events in suspension are set as up events.

At step S914, the trace tearing filter clears the current value of the consecutive up event counter such that the current value equals zero.

If the trace tearing filter at step S910 determines that the up event continued less than N times, the trace tearing filter suspends the present up event and increments the consecutive up event counter at step S918.

Figure 10:
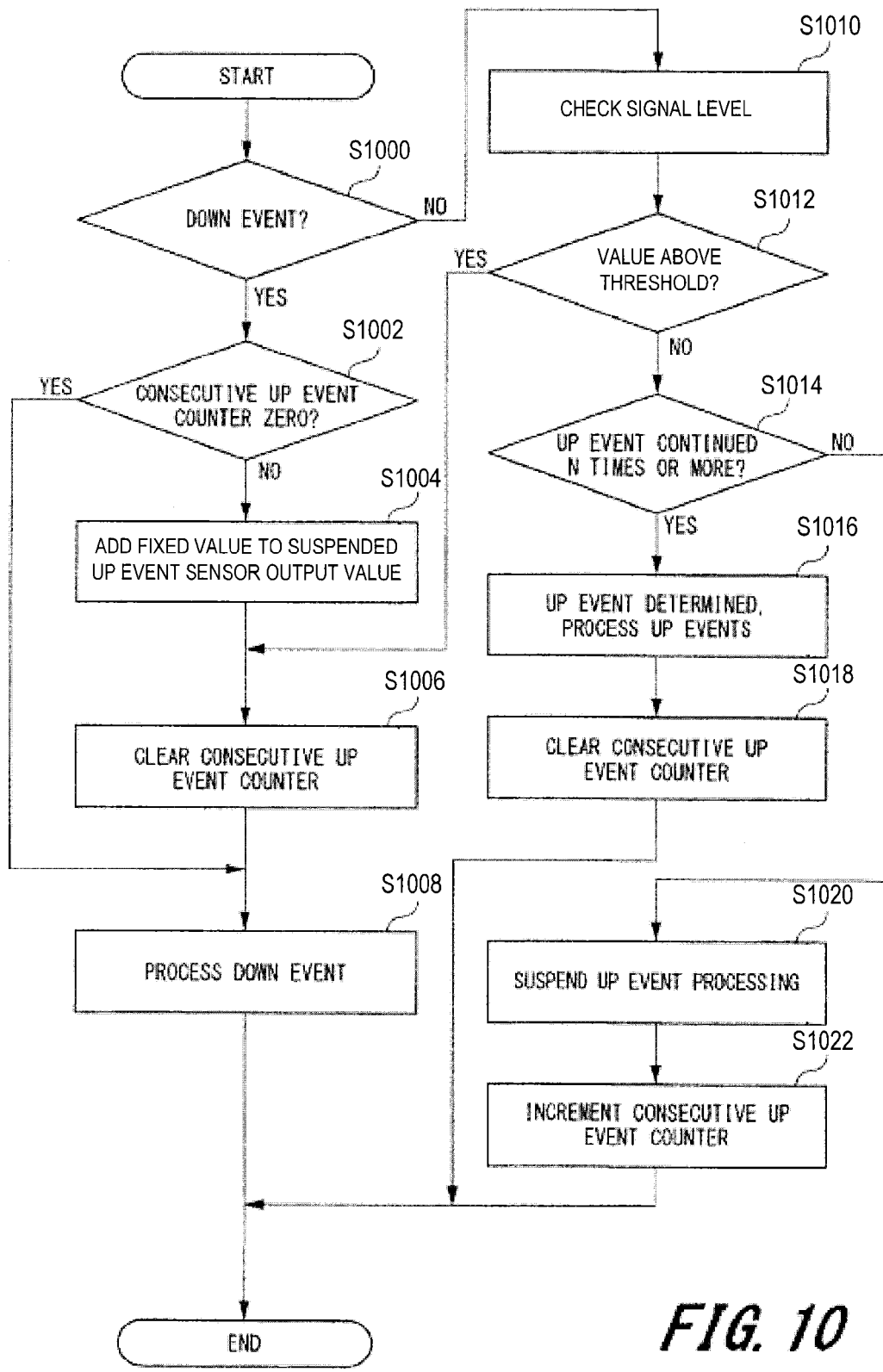
FIG. 10 illustrates another exemplary algorithmic flowchart for processing performed by a trace tearing filter according to one aspect of the present disclosure.

Next, FIG. 10 illustrates another exemplary algorithmic flowchart for processing related to the trace tearing filter. The exemplary processing illustrated by the flowchart of FIG. 10 is similar to the example discussed above with respect to FIG. 9; however, the example of FIG. 10 includes processing for converting an up event to a down event by adding a fixed value to the sensor output magnitude.

Referring now to FIG. 10, the trace tearing filter at step S1000 determines whether a down event has been generated. If the trace tearing filter determines at step S1000 that a down event has been generated, the trace tearing filter determines at step S1002 whether the consecutive up event counter is equal to zero. If it determined at step S1002 that the consecutive up event counter equals zero, the trace tearing filter outputs the down event indicating that the stylus is presently contacting the operation surface of the touch panel 131.

Otherwise, if it is determined at step S1002 that the consecutive up event counter does not equal zero, the trace tearing filter at step S1004 adds a fixed value to the value of the center output corresponding to the suspended up event. The fixed value may be a predetermined value, the magnitude of which may be stored in the memory 150. The fixed value may correspond to a sensor magnitude that would result in the summation of the sensor output plus the fixed value exceeding a predetermined threshold value, effectively changing the suspended up event to a down event. At step S1006, the trace tearing filter clears the current value of the consecutive up event counter causing the current value to equal zero, and the down event is processed at step S1008.

If the trace tearing filter at step S1000 determines that the present event is an up event, the trace tearing filter at step S1010 checks the detected sensor level value to determine whether the signal level value corresponds to an up event. For example, the trace tearing filter may confirm the present event is an up event based on the sensor level output magnitude value.

At step S1012, the trace tearing filter determines whether the sensor output magnitude value is above a predetermined threshold value. In certain aspects of the present disclosure, the threshold used in the comparison at step S1012 may be a sensor output magnitude value that is smaller than the threshold value distinguishing an up event from a down event. If the sensor output value is determined to be above the threshold at step S1012, the present up event is registered as a down event and the processing continues at step S1006.

Otherwise, the trace tearing filter determines at step S1014 whether the present up event has been continuously generated N or more times. If the up event has been determined to have been continuously generated N or more times at step S1014, the present event is determined to be an up event, and any suspended events are determined to be up events. The trace tearing filter then clears the consecutive up event counter to zero at step S1018.

Otherwise, if the trace tearing filter at step S1014 determines that the up event has not been continuously generated at least N times, the trace tearing filter suspends the present up event at step S1020 and increments the consecutive up event counter by one at step S1022.

Figure 11:
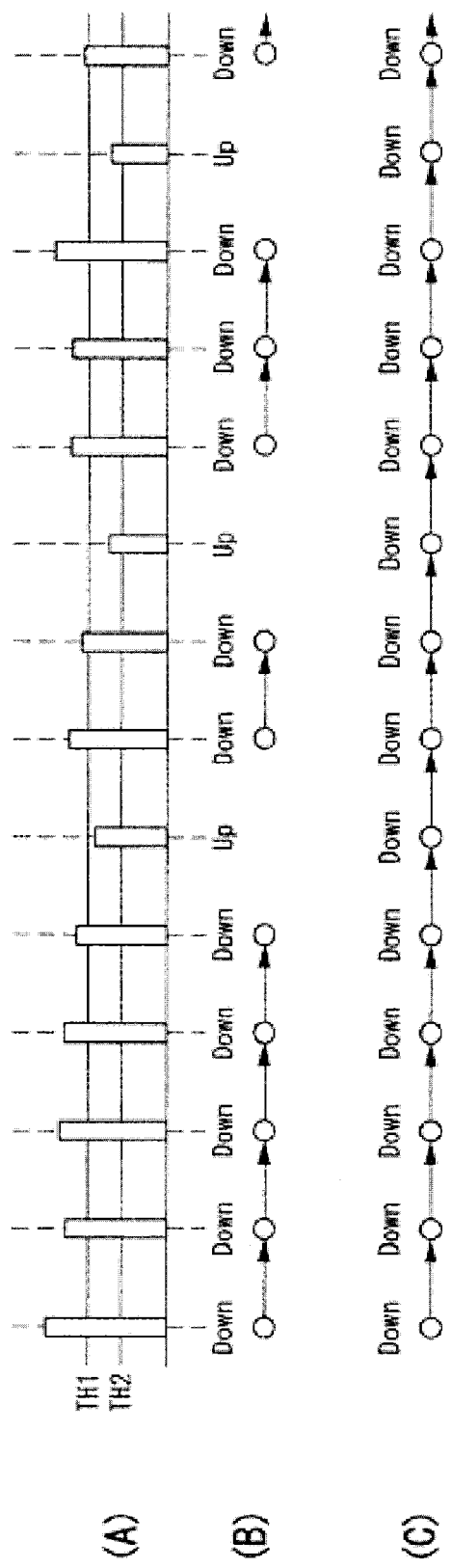
FIG. 11 illustrates a non-limiting example of determining up events and down events based on sensor outputs detected by a touch panel according to one aspect of the present disclosure.

Next, FIG. 11 illustrates a non-limiting example of determining up events and down events based on sensor outputs detected in the touch panel section 130. Line A of FIG. 11 illustrates a time-series bar graph of sensor output magnitudes relative to threshold values TH1 and TH2 for one scanning cycle. In this example, the first threshold value TH1 is a predetermined threshold value for distinguishing between an up event and a down event. For example, the first threshold value TH1 may be selected based on sensor outputs typical of those that occur when an instruction object is directly in contact with the operation surface of the touch panel 131. The second threshold value TH2 is assumed in this example to be a predetermined threshold value that is set lower than the first threshold value TH1. In certain aspects of the present disclosure, the second threshold value may correspond to a sensor output value typical of those occurrences in which an instruction object momentarily disconnects from the operation surface of the touch panel 131 during a touch operation, or when the instruction object is not applied to the operation surface of the touch panel 131 with sufficient pressure. For example, the second threshold value TH2 may correspond to a sensor output magnitude value resultant from an instruction object being within a predetermined range of the operation surface of the touch panel 131. The second threshold value TH2 may, for example, correspond to the threshold value used in the processing discussed above with respect to step S1012 of FIG. 10.

Line B of FIG. 11 illustrates sequential determination results of the controller 110 distinguishing between up events and down events using only the first threshold value TH1. In this case, the controller 110 may perform a comparison between received sensor output values and the first threshold value TH1 and determine that a down event has occurred when the received sensor output value is greater than the first threshold value TH1. In the case of FIG. 11, the controller 110 determines, based on the comparison of the sensor output values and the first threshold value TH1, that five down events occur consecutively followed by a single up event. The controller 110 determines that the single up event has occurred following the five continuous down events based on the sensor output value being less than the first threshold value TH1, as illustrated in line A of FIG. 11. The controller 110 may determine that two other up events occur during the scanning cycle using similar methods.

Processing performed in accordance with the methods described for line B of FIG. 11 may result in handwritten lines being displayed on the display 120 only in cases in which down events are determined to have occurred. That is, the controller 110 may perform processing and/or a predetermined function related to drawing handwritten characters, numbers, etc. in response to detecting down events above the threshold TH1, and suspend processing related to displaying the handwritten characters, numbers, etc. when the sensor output magnitude is below the threshold TH1. Consequently, displayed outputs resultant from the methods described for line B of FIG. 11 may result in interruptions of the lines forming the characters, numbers, etc., such as in the case of FIG. 2A.

Referring now to line C of FIG. 11, the controller 110 may perform a similar determination process as that described above for line B, but rather than registering up events when the sensor output value is determined to be less than the first threshold value TH1, the controller 110 may perform a second comparison of the sensor output value with the second threshold value TH2 and "convert" the up event to a down event if the sensor output value is above the second threshold value TH2. As illustrated in line C of FIG. 11, the three up events that were determined to have occurred in the process discussed above for line B have been converted to down events because the sensor output values are greater than the second threshold value TH2. This process may mitigate momentary disconnections between an instruction object and the operation surface of the touch panel 131 that may otherwise result in interruptions of lines displayed as a result of detecting movement of the instruction object on the operation surface of the touch panel 131.

Figure 12:
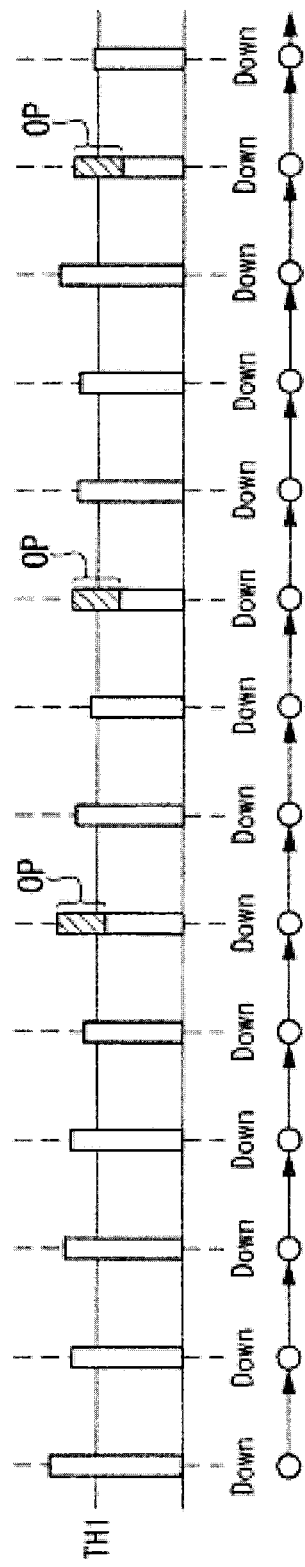
FIG. 12 illustrates another non-limiting example of determining up events and down events based on sensor outputs detected by a touch panel according to one aspect of the present disclosure.

Next, FIG. 12 illustrates another non-limiting example of distinguishing between up events and down events based on a sensor output value comparison to a threshold. The example of FIG. 12 illustrates a case in which the sensor output value for each sample in a sample cycle is compared to the first threshold value TH1, which may be the same magnitude that discussed above for FIG. 11. In the example of FIG. 12, the controller 110 determines that a down event has occurred if the sensor output value is above the first threshold value TH1. However, if the controller 110 determines that the sensor output value is below the first threshold value TH1, the controller 110 adds a predetermined fixed value "OP" to the sensor value and performs a second comparison of the summation to the first threshold value TH1. If the summation of the sensor output value and the fixed value OP is greater than the first threshold value TH1, the controller 110 registers the detected event as a down event.

For the specific sensor outputs illustrated in FIG. 12, three samples are determined to be below the threshold TH1. After adding the fixed value OP to the three samples falling below the threshold TH1, the resulting summation is determined to be above the threshold TH1. Therefore, the three events are registered as down events rather than up events. This processing may mitigate the case where the instruction object briefly disconnects from, but remains in close proximity to, the operation surface of the touch panel 131 during the touch operation by "converting" events within a predetermined range of the down event detection threshold to up events.

Figure 13A:
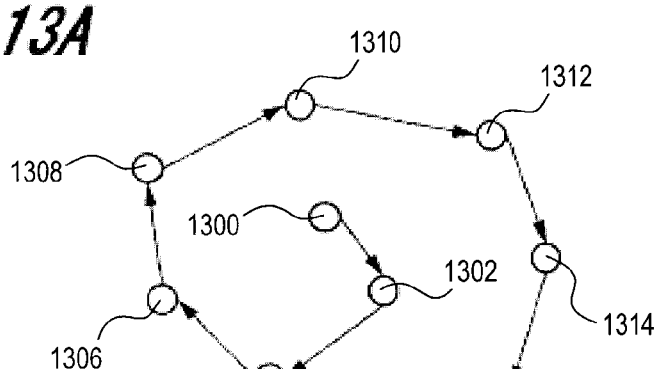
FIGS. 13A and 13B illustrate a non-limiting example of interpolating intermediate points between detected coordinate points according to one aspect of the present disclosure.
Figure 13B:
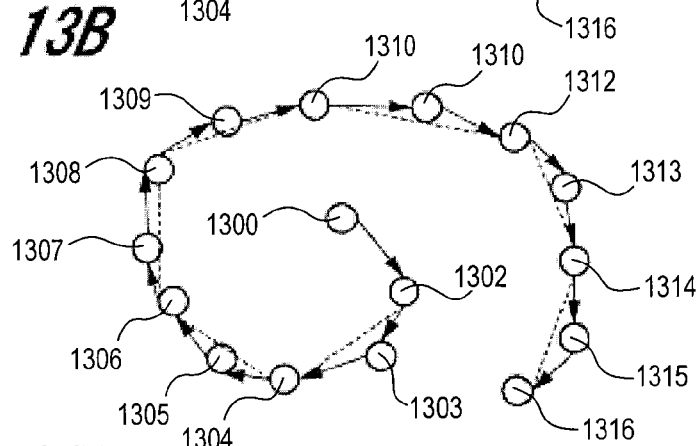

Next, FIGS. 13A and 13B illustrate an exemplary process for applying a smoothing filter according to aspects of the present disclosure. Referring first to FIG. 13A, FIG. 13A illustrates coordinate positions 1300, 1302, 1304, 1306, 1308, 1310, 1312, 1314, and 1316. The coordinate positions illustrated in FIG. 13A may be determined by the touch panel section 130 in response to a movement of an instruction object on the operation surface of the touch panel 131. Solid arrows connecting the coordinate points illustrate the movement of the instruction object from the initially detected coordinate point 1300 to the final detected coordinate point 1316. It may be assumed that the instruction object actually moves with a constant curvature during the touch operation in this example, and the unnatural curvature of FIG. 13A results from limitations in touch detection (e.g., sensor placement, sampling frequency, etc.).

In certain aspects of the present disclosure, when applying a smoothing filter, the controller 110 may interpolate intermediate coordinates between detected coordinates when a touch operation such as that in FIG. 13A is performed. FIG. 13B illustrates a non-limiting example of the controller 110 determining intermediate coordinates based on detected coordinates determined during a touch operation. In the example of FIG. 13B, a controller 110 performs an interpolation process to determine intermediate coordinates 1303, 1305, 1307, 1309, 1311, 1313, and 1315 between the coordinates shown and discussed above for FIG. 13A. The controller 110 may determine the intermediate coordinates based on features of previous and/or subsequently detected coordinates, such as curvature and direction of motion. Solid arrows in FIG. 13B illustrate the improved movement detection of the instruction object during the touch operation, while the dashed arrows represent the detected movement of the instruction object using the method of FIG. 13A. As is evident in FIG. 13B, the intermediate coordinates provide for a more natural and representative output corresponding to the actual movement of the instruction object during the touch operation. Mathematical functions for interpolating coordinate positions based on aspects of previously and/or subsequently detected coordinate positions may, for example, include regression and best fit models.

Figure 14A:
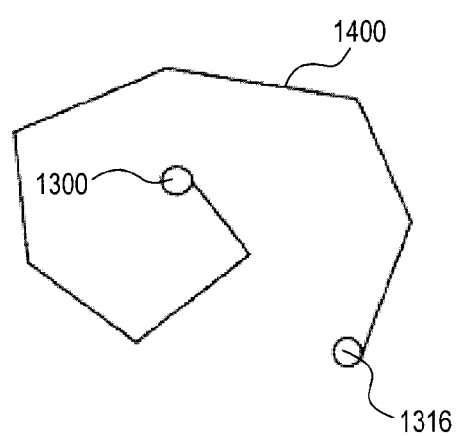
FIGS. 14A and 14B illustrate non-limiting examples of display outputs respectively corresponding to FIGS. 13A and 13B.
Figure 14B:
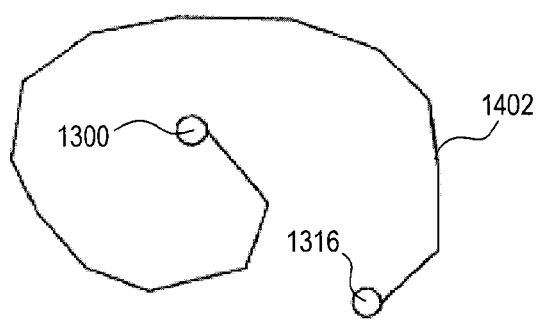

Next, FIGS. 14A and 14B illustrate non-limiting examples of displayed outputs resultant from displaying lines based on touch operation detection with and without the inclusion of a smoothing filter. Referring first to FIG. 14A, FIG. 14A illustrates a line 1400 connecting coordinate positions 1300 and 1316. The line output shown in FIG. 14A may correspond to the detection result discussed above for FIG. 13A. As evident in the line 1400 shown in FIG. 14A, the case in which a smoothing filter is not applied results in an unnatural curvature of the line 1400, which may result in an undesirable output being displayed on the display 120 in response to detected instruction object movement during touch operations.

In contrast, FIG. 14B illustrates a line 1402 connecting the points 1300 and 1316. The line 1402 may correspond to the application of a smoothing filter such as in the case discussed above for FIG. 13B. By interpolating intermediate coordinate positions such as in the example discussed above for FIG. 13B, the line 1402 output on the display 120 has a much more natural curvature relative to the case of FIG. 14A, thereby improving device performance for outputting lines in response to detecting instruction object movement during touch operations.

Figure 15A:
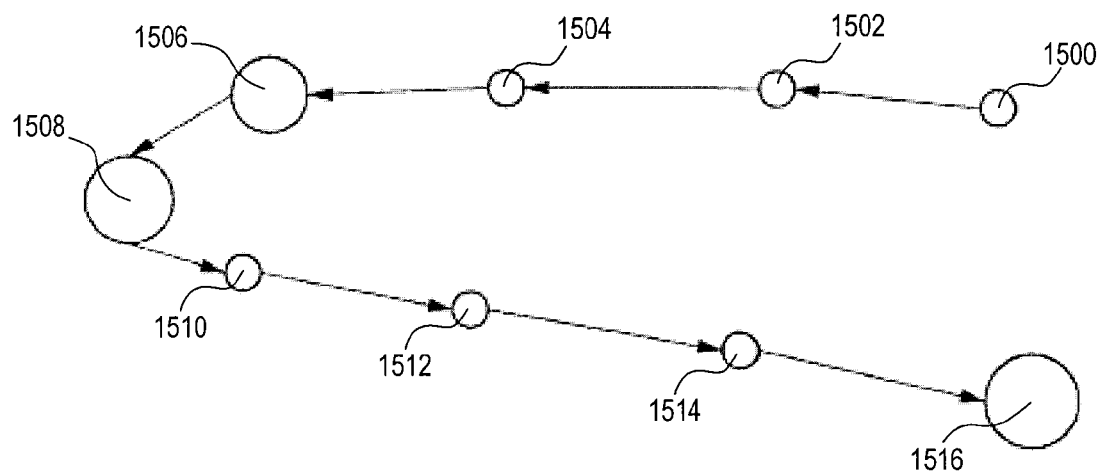
FIGS. 15A and 15B illustrate a non-limiting example of interpolating intermediate points between detected coordinate points based on a touch area size according to one aspect of the present disclosure.
Figure 15B:
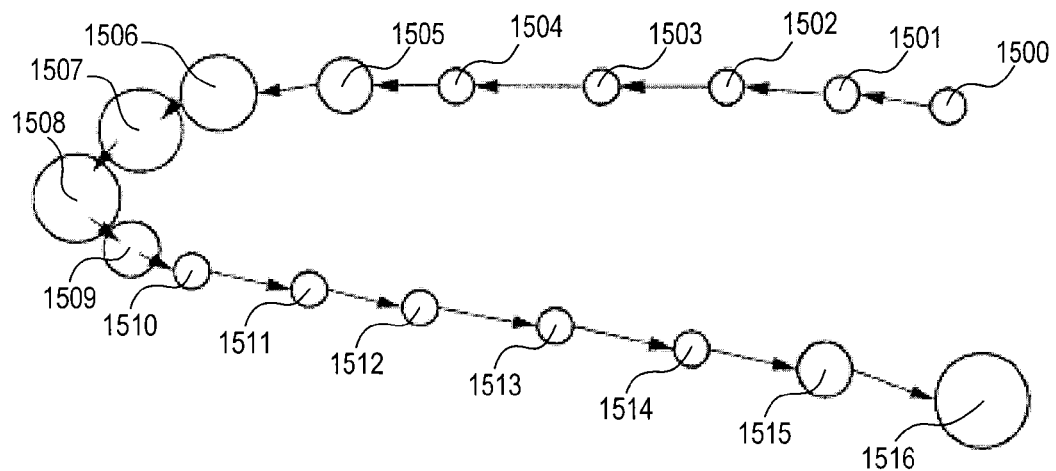

Next, FIGS. 15A and 15B illustrate a non-limiting example in which aspects of a smoothing filter are applied for smoothing a thickness of a line output on a touch panel display in response to movement of an instruction object during a touch operation. In one aspect of the present disclosure, the controller 110 may interpolate intermediate points between detected coordinate points based on a touch area size of the detected coordinate points and/or corresponding sensor output magnitudes.

Referring first to FIG. 15A, FIG. 15A illustrates detected coordinate points 1500, 1502, 1504, 1506, 1508, 1510, 1512, 1514, and 1516. The detected coordinate points illustrated in FIG. 15A are shown in varied sizes to represent variations in touch area size detected by the touch panel section 130. An increase in touch area size may, for example, result from a user applying greater pressure to the operation surface of the touch panel 131 during a touch operation. Solid arrow lines illustrate a progression of the touch operation from the initially detected coordinate point 1500 to the final detected coordinate point 1516. When applying aspects of the smoothing filter for interpolating touch area size and corresponding displayed line thickness, the controller 110 may analyze two or more detected coordinate points and interpolate a size of an intermediate point or points such that changes in displayed line thickness resultant, e.g., from changes in pressure applied by the instruction object during the touch operation appear smoother than in the case in which a smoothing filter is not applied.

Referring now to FIG. 15B, FIG. 15B illustrates intermediate points 1501, 1503, 1505, 1507, 1509, 1511, 1513, and 1515, which are shown between the points illustrated above for FIG. 15A. As discussed above, the size of the intermediate points illustrated in FIG. 15B corresponds to the displayed line thickness resultant from outputting a line on the display 120 based on the detected touch operation. The size of the intermediate points illustrated in FIG. 15B may be an interpolated size analyzed on the basis of one or more preceding and/or one or more subsequent detected coordinate points. For example, the size of intermediate point 1506 of FIG. 15B may be a linear or weighted average of the size of the previously detected coordinate point 1505 and the subsequently detected coordinate point 1507. A skilled artisan will appreciate that performing an interpolation such that more than one intermediate point is calculated will result in improved performance with respect to smoothing the output displayed on the display 120 following detection and processing of the touch operation by methods described herein. Further, utilizing more detected coordinate points in the interpolation process may also improve performance.

Figure 16A:
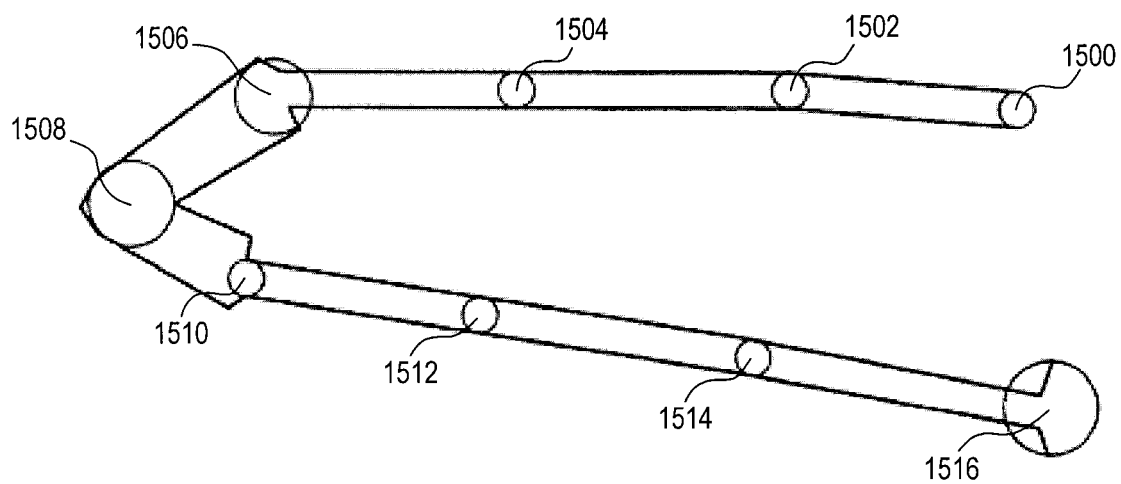
FIGS. 16A and 16B illustrate non-limiting examples of display outputs corresponding to FIGS. 15A and 15B, respectively.

FIG. 16A illustrates an exemplary output corresponding to FIG. 15A. FIG. 16A shows changes in line thickness in the case in which a smoothing filter is not applied. The example of FIG. 16A illustrates the detected coordinate points shown in FIG. 15A connected by a line that has a thickness that changes based on the size of the detected coordinate points. As evident in the figure, large changes in touch area size result in abrupt changes in line thickness, which is undesirable for displaying an output line on the display 120.

Figure 16B:
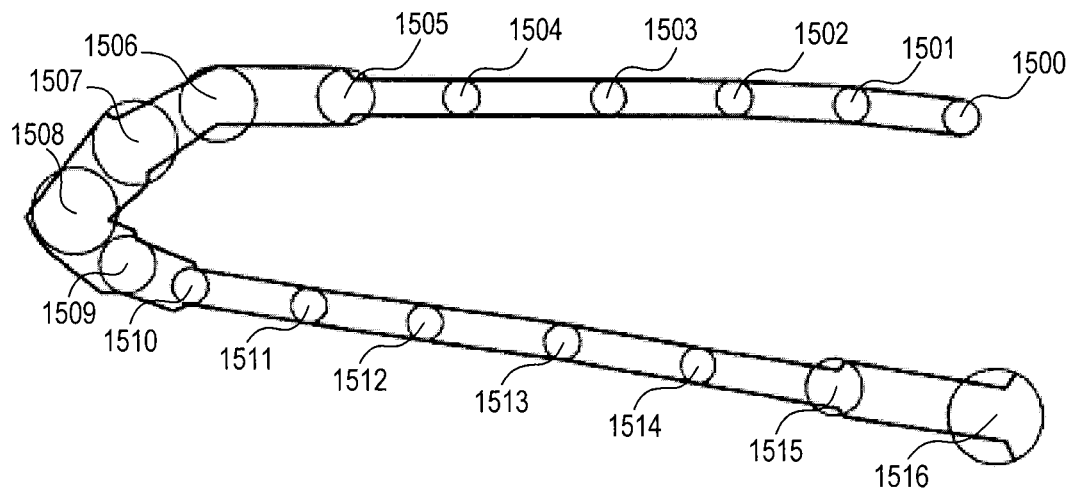

In contrast, FIG. 16B illustrates an example in which the coordinate points and the intermediate points illustrated in FIG. 15B are connected by a similar line as that in FIG. 16A resulting in smoother changes in line thickness and an improved output result.

It should be appreciated that aspects of the smoothing filter described herein may be applied to both cases in which a user uses a finger and/or a stylus-type instruction object when performing touch operations. That is, the processes, methods, and functions described herein are not limited to being performed only in the case in which a particular instruction object type is used. For example, illustrative examples discussed herein using a finger as an instruction object may be applied to the case in which a stylus-type instruction object is used.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process.

Additionally, some implementations may be performed on modules or hardware not identical to those described. Accordingly, other implementations are within the scope that may be claimed. For example, aspects of the present disclosure may be utilized in a desktop computer, a laptop computer, a tablet computer, a smartphone, a navigation device, an electronic payment terminal, or the like.

It must be noted that, as used in the specification and the appended claims, the singular forms "a," "an," and "the" include plural referents unless the context clearly dictates otherwise.

The above disclosure also encompasses the embodiments noted below.

(1) An apparatus comprising: a touch panel display including one or more sensors for detecting an input operation by an instruction object on an operation surface of the touch panel display; and circuitry configured to: acquire, from the one or more sensors, one or more coordinates corresponding to one or more positions of the instruction object on the operation surface of the touch panel display during the input operation; determine, as a first determination based on an output from the one or more sensors in response to detecting the input operation, a current condition of the instruction object during the input operation, the current condition being an up condition or a down condition; determine, as a second determination when the current condition of the instruction object is the down condition, based on one or more previous conditions of the instruction object stored in a memory, whether the previous condition immediately preceding the current condition is the up condition; convert, when the previous condition immediately preceding the current condition is the up condition, the immediately preceding previous condition to the down condition and update the one or more previous conditions stored in the memory based on the conversion result; control, based on the one or more acquired coordinates and the one or more previous conditions stored in the memory, the touch panel display to output a continuous line in the interface corresponding to the acquired one or more coordinates at which the instruction object is determined to be in the down condition, wherein the down condition corresponds to a state in which the instruction object is within a predetermined range from the operation surface of the touch panel display, and the up condition corresponds to a state in which the instruction object is outside the predetermined range from the operation surface of the touch panel display, and a shape of the continuous line corresponds to a movement of the instruction object on the operation surface of the touch panel display during the input operation.

(2) The apparatus of (1), wherein the circuitry is configured to acquire, from the one or more sensors, one or more capacitance values for each of the one or more coordinates corresponding to the one or more positions of the instruction object on the operation surface of the touch panel display during the input operation.

(3) The apparatus of (1) or (2), wherein: the circuitry performs the first determination by comparing the one or more capacitance values to a first threshold value, when a detected capacitance value of the one or more capacitance values is greater than or equal to the first threshold value, the circuitry determines the current condition of the instruction object during the input operation as being the down condition, and when the detected capacitance value of the one or more capacitance values is less than the first threshold value, the circuitry determines the current condition of the instruction object during the input operation as being the up condition.

(4) The apparatus of any one of (1) to (3), wherein: when the detected capacitance value of the one or more capacitance values is less than the first threshold value and the detected capacitance value has been detected by the one or more sensors within a predetermined period of time after the down condition has occurred, the circuitry compares the detected capacitance value to a second threshold value that is lower than the first threshold value, and when the detected value is greater than the second threshold value, the circuitry determines the current condition of the instruction object during the input operation as being the down condition.

(5) The apparatus of any one of (1) to (4), wherein when the detected capacitance value of the one or more capacitance values is less than the first threshold value, the circuitry adds a predetermined fixed value to the detected capacitance value.

(6) The apparatus of any one of (1) to (5), wherein: the circuitry compares the summation of the detected capacitance value and the predetermined fixed value to the first threshold value, and when the summation is greater than the first threshold value, the circuitry determines the current condition of the instruction object during the input operation as being the down condition.

(7) The apparatus of any one of (1) to (6), wherein the circuitry is configured to determine, based on the output received from the one or more sensors in the first determination, if the instruction object performing the input operation is a finger or a stylus.

(8) The apparatus of any one of (1) to (7), wherein the second determination is performed only when the finger is used to perform the input operation.

(9) The apparatus of any one of (1) to (8), wherein: the circuitry is configured to interpolate one or more intermediate coordinates between the one or more coordinates corresponding to one or more positions of the instruction object on the operation surface of the touch panel display during the input operation, and the circuitry is configured to control the touch panel display to output the continuous line in the interface based on the one or more intermediate coordinates and the acquired one or more coordinates at which the instruction object is determined to be in the down condition.

(10) The apparatus of any one of (1) to (9), wherein: the circuitry is configured to calculate, based on the output from the one or more sensors in response to detecting the input operation, one or more touch areas corresponding to each of the acquired one or more coordinates at which the instruction object is determined to be in the down condition, the circuitry is configured to interpolate one or more intermediate touch areas between the one or more coordinates corresponding to one or more positions of the instruction object on the operation surface of the touch panel display during the input operation, and the circuitry is configured to control the touch panel display to output the continuous line in the interface based on the one or more intermediate touch areas and the one or more touch areas corresponding to each of the acquired one or more coordinates at which the instruction object is determined to be in the down condition.

(11) A method of controlling a touch panel display including one or more sensors for detecting an input operation by an instruction object on an operation surface of the touch panel display, the method comprising: acquiring, by circuitry from the one or more sensors, one or more coordinates corresponding to one or more positions of the instruction object on the operation surface of the touch panel display during the input operation; determining, by the circuitry as a first determination based on an output from the one or more sensors in response to detecting the input operation, a current condition of the instruction object during the input operation, the current condition being an up condition or a down condition; determining, by the circuitry as a second determination when the current condition of the instruction object is the down condition, based on one or more previous conditions of the instruction object stored in a memory, whether the previous condition immediately preceding the current condition is the up condition; converting, by the circuitry when the previous condition immediately preceding the current condition is the up condition, the immediately preceding previous condition to the down condition and updating the one or more previous conditions stored in the memory based on the conversion result; controlling, by the circuitry based on the one or more acquired coordinates and the one or more previous conditions stored in the memory, the touch panel display to output a continuous line in the interface corresponding to the acquired one or more coordinates at which the instruction object is determined to be in the down condition, wherein the down condition corresponds to a state in which the instruction object is within a predetermined range from the operation surface of the touch panel display, and the up condition corresponds to a state in which the instruction object is outside the predetermined range from the operation surface of the touch panel display, and a shape of the continuous line corresponds to a movement of the instruction object on the operation surface of the touch panel display during the input operation.

(12) The method of (11), further comprising acquiring, by the circuitry from the one or more sensors, one or more capacitance values for each of the one or more coordinates corresponding to the one or more positions of the instruction object on the operation surface of the touch panel display during the input operation.

(13) The method of (11) or (12), wherein: the circuitry performs the first determination by comparing the one or more capacitance values to a first threshold value, when a detected capacitance value of the one or more capacitance values is greater than or equal to the first threshold value, the circuitry determines the current condition of the instruction object during the input operation as being the down condition, and when the detected capacitance value of the one or more capacitance values is less than the first threshold value, the circuitry determines the current condition of the instruction object during the input operation as being the up condition.

(14) The method of any one of (11) to (13), wherein: when the detected capacitance value of the one or more capacitance values is less than the first threshold value and the detected capacitance value has been detected by the one or more sensors within a predetermined period of time after the down condition has occurred, the circuitry compares the detected capacitance value to a second threshold value that is lower than the first threshold value, and when the detected value is greater than the second threshold value, the circuitry determines the current condition of the instruction object during the input operation as being the down condition.

(15) The method of any one of (11) to (14), wherein when the detected capacitance value of the one or more capacitance values is less than the first threshold value, the circuitry adds a predetermined fixed value to the detected capacitance value.

(16) The method of any one of (11) to (15), wherein: the circuitry compares the summation of the detected capacitance value and the predetermined fixed value to the first threshold value, and when the summation is greater than the first threshold value, the circuitry determines the current condition of the instruction object during the input operation as being the down condition.

(17) The method of any one of (11) to (16), further comprising determining, by the circuitry based on the output received from the one or more sensors in the first determination, if the instruction object performing the input operation is a finger or a stylus.

(18) The method of any one of (11) to (17), wherein the second determination is performed only when the finger is used to perform the input operation.

(19) The method of any one of (11) to (18), further comprising: interpolating, by the circuitry, one or more intermediate coordinates between the one or more coordinates corresponding to one or more positions of the instruction object on the operation surface of the touch panel display during the input operation, and controlling, by the circuitry, the touch panel display to output the continuous line in the interface based on the one or more intermediate coordinates and the acquired one or more coordinates at which the instruction object is determined to be in the down condition.

(20) The method of any one of (11) to (19), further comprising: calculating, by the circuitry based on the output from the one or more sensors in response to detecting the input operation, one or more touch areas corresponding to each of the acquired one or more coordinates at which the instruction object is determined to be in the down condition, the circuitry is configured to interpolate one or more intermediate touch areas between the one or more coordinates corresponding to one or more positions of the instruction object on the operation surface of the touch panel display during the input operation, and the circuitry is configured to control the touch panel display to output the continuous line in the interface based on the one or more intermediate touch areas and the one or more touch areas corresponding to each of the acquired one or more coordinates at which the instruction object is determined to be in the down condition.

(21) A non-transitory computer readable medium having instructions stored therein that when executed by one or more processors caused the one or more processors to execute a method, the method comprising: detecting an input operation by an instruction object on an operation surface of a touch panel display, the touch panel display including one or more sensors; acquiring, from the one or more sensors, one or more coordinates corresponding to one or more positions of the instruction object on the operation surface of the touch panel display during the input operation; determining, as a first determination based on an output from the one or more sensors in response to detecting the input operation, a current condition of the instruction object during the input operation, the current condition being an up condition or a down condition; determining, as a second determination when the current condition of the instruction object is the down condition, based on one or more previous conditions of the instruction object stored in a memory, whether the previous condition immediately preceding the current condition is the up condition; converting, when the previous condition immediately preceding the current condition is the up condition, the immediately preceding previous condition to the down condition and updating the one or more previous conditions stored in the memory based on the conversion result; controlling, based on the one or more acquired coordinates and the one or more previous conditions stored in the memory, the touch panel display to output a continuous line in the interface corresponding to the acquired one or more coordinates at which the instruction object is determined to be in the down condition, wherein the down condition corresponds to a state in which the instruction object is within a predetermined range from the operation surface of the touch panel display, and the up condition corresponds to a state in which the instruction object is outside the predetermined range from the operation surface of the touch panel display, and a shape of the continuous line corresponds to a movement of the instruction object on the operation surface of the touch panel display during the input operation.

The invention claimed is:

1. An apparatus comprising:
a touch panel display including one or more sensors for detecting an input operation by an instruction object on an operation surface of the touch panel display; and
circuitry configured to
acquire, from the one or more sensors, one or more coordinates corresponding to one or more positions of the instruction object on the operation surface of the touch panel display during the input operation;
determine whether a first criterion is satisfied, the first criterion corresponding to an output value from the one or more sensors being equal to or greater than a first threshold value;
determine a current condition of the instruction object during the input operation as a down condition when the first criterion is satisfied;
determine whether a second criterion is satisfied when the first criterion is not satisfied, the second criterion corresponding to a difference between the output value and the first threshold value being less than a predetermined difference and a first predetermined number of consecutive down conditions immediately preceding the input operation;
determine the current condition as the down condition when the second criterion is satisfied; and
determine the current condition as an up condition when the second criterion is not satisfied.

2. The apparatus of claim 1, wherein
the circuitry is configured to acquire, from the one or more sensors, one or more capacitance values for each of the one or more coordinates corresponding to the one or more positions of the instruction object on the operation surface of the touch panel display during the input operation; and
the output value is one of the one or more capacitance values.

3. The apparatus of claim 1, wherein:
the circuitry is configured to determine whether the second criterion is satisfied by comparing the output value with a second threshold value, the second threshold value being less than the first threshold value by the predetermined difference.

4. The apparatus of claim 1, wherein:
the circuitry is configured to determine whether the second criterion is satisfied by adding the predetermined difference to the output value and comparing a summation of the predetermined difference and the output value with the first threshold.

5. The apparatus of claim 1, wherein the circuitry is configured to
determine whether a third criterion is satisfied when the current condition is the down condition, the third criterion corresponding to a number of consecutive up conditions immediately preceding the current condition being equal to or less than a second predetermined number; and
convert the consecutive up conditions immediately preceding the current condition to down conditions when the third criterion is satisfied.

6. The apparatus of claim 5, wherein
the circuitry is configured to determine, based on output from the one or more sensors, if the instruction object performing the input operation is a finger or a stylus.

7. The apparatus of claim 6, wherein
the circuitry is configured to determine whether the third criterion is satisfied only when the finger is used to perform the input operation.

8. The apparatus of claim 1, wherein:
the circuitry is configured to interpolate one or more intermediate coordinates between the one or more coordinates corresponding to the one or more positions of the instruction object on the operation surface of the touch panel display during the input operation, and
the circuitry is configured to control the touch panel display to output a continuous line in an interface based on the one or more intermediate coordinates and the acquired one or more coordinates at which the instruction object is determined to be in the down condition.

9. The apparatus of claim 1, wherein:
the circuitry is configured to calculate, based on output from the one or more sensors in response to detecting the input operation, one or more touch areas corresponding to each of the acquired one or more coordinates at which the instruction object is determined to be in the down condition,
the circuitry is configured to interpolate one or more intermediate touch areas between the one or more coordinates corresponding to the one or more positions of the instruction object on the operation surface of the touch panel display during the input operation, and
the circuitry is configured to control the touch panel display to output a continuous line in an interface based on the one or more intermediate touch areas and the one or more touch areas corresponding to each of the acquired one or more coordinates at which the instruction object is determined to be in the down condition.

10. A method of controlling a touch panel display including one or more sensors for detecting an input operation by an instruction object on an operation surface of the touch panel display, the method comprising:
acquiring, by circuitry from the one or more sensors, one or more coordinates corresponding to one or more positions of the instruction object on the operation surface of the touch panel display during the input operation;
determining whether a first criterion is satisfied, the first criterion corresponding to an output value from the one or more sensors being equal to or greater than a first threshold value;
determining a current condition of the instruction object during the input operation as a down condition when the first criterion is satisfied;
determining whether a second criterion is satisfied when the first criterion is not satisfied, the second criterion corresponding to a difference between the output value and the first threshold value being less than a predetermined difference and a first predetermined number of consecutive down conditions immediately preceding the input operation;
determining the current condition as the down condition when the second criterion is satisfied; and
determining the current condition as an up condition when the second criterion is not satisfied.

11. The method of claim 10, further comprising
acquiring, by the circuitry from the one or more sensors, one or more capacitance values for each of the one or more coordinates corresponding to the one or more positions of the instruction object on the operation surface of the touch panel display during the input operation, the output value being one of the one or more capacitance values.

12. The method of claim 10, wherein determining whether the second criterion is satisfied comprises:
comparing the output value with a second threshold value, the second threshold value being less than the first threshold value by the predetermined difference.

13. The method of claim 10, wherein determining whether the second criterion is satisfied comprises:
adding the predetermined difference to the output value; and
comparing a summation of the predetermined difference and the output value with the first threshold.

14. The method of claim 10, further comprising:
determining whether a third criterion is satisfied when the current condition is the down condition, the third criterion corresponding to a number of consecutive up conditions immediately preceding the current condition being equal to or less than a second predetermined number; and
converting the consecutive up conditions immediately preceding the current condition to down conditions when the third criterion is satisfied.

15. The method of claim 14, further comprising
determining, by the circuitry based on output from the one or more sensors, if the instruction object performing the input operation is a finger or a stylus.

16. The method of claim 15, wherein determining whether the third criterion is satisfied is performed only when the finger is used to perform the input operation.

17. The method of claim 10, further comprising:
interpolating, by the circuitry, one or more intermediate coordinates between the one or more coordinates corresponding to the one or more positions of the instruction object on the operation surface of the touch panel display during the input operation, and
controlling, by the circuitry, the touch panel display to output a continuous line in an interface based on the one or more intermediate coordinates and the acquired one or more coordinates at which the instruction object is determined to be in the down condition.

18. The method of claim 10, further comprising:
calculating, by the circuitry based on output from the one or more sensors in response to detecting the input operation, one or more touch areas corresponding to each of the acquired one or more coordinates at which the instruction object is determined to be in the down condition,
the circuitry is configured to interpolate one or more intermediate touch areas between the one or more coordinates corresponding to the one or more positions of the instruction object on the operation surface of the touch panel display during the input operation, and the circuitry is configured to control the touch panel display to output a continuous line in an interface based on the one or more intermediate touch areas and the one or more touch areas corresponding to each of the acquired one or more coordinates at which the instruction object is determined to be in the down condition.

19. A non-transitory computer readable medium having instructions stored therein that when executed by one or more processors caused the one or more processors to execute a method, the method comprising:

detecting an input operation by an instruction object on an operation surface of a touch panel display, the touch panel display including one or more sensors;

acquiring, from the one or more sensors, one or more coordinates corresponding to one or more positions of the instruction object on the operation surface of the touch panel display during the input operation;

determining whether a first criterion is satisfied, the first criterion corresponding to an output value from the one or more sensors being equal to or greater than a first threshold value;

determining a current condition of the instruction object during the input operation as a down condition when the first criterion is satisfied;

determining whether a second criterion is satisfied when the first criterion is not satisfied, the second criterion corresponding to a difference between the output value and the first threshold value being less than a predetermined difference and a first predetermined number of consecutive down conditions immediately preceding the input operation;

determining the current condition as the down condition when the second criterion is satisfied; and determining the current condition as an up condition when the second criterion is not satisfied.

20. The non-transitory computer readable medium of claim 19, wherein the method further comprises:

determining whether a third criterion is satisfied when the current condition is the down condition, the third criterion corresponding to a number of consecutive up conditions immediately preceding the current condition being equal to or less than a second predetermined number; and converting the consecutive up conditions immediately preceding the current condition to down conditions when the third criterion is satisfied.

\* \* \* \* \*